US008835515B2

(12) United States Patent
Persson et al.

(10) Patent No.: US 8,835,515 B2
(45) Date of Patent: *Sep. 16, 2014

(54) SILICA-BASED SOLS

(75) Inventors: Michael Persson, Västra Frölunda (SE); Marek Tokarz, Göteborg (SE); Maj-Lis Dahlgren, Nödinge (SE); Hans Erik Johansson-Vestin, Kungälv (SE)

(73) Assignee: Akzo Nobel, N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,346

(22) Filed: Apr. 4, 2011

(65) Prior Publication Data

US 2011/0196047 A1 Aug. 11, 2011

Related U.S. Application Data

(60) Continuation of application No. 10/999,867, filed on Jan. 8, 2005, now Pat. No. 7,919,535, which is a division of application No. 10/007,861, filed on Nov. 5, 2001, now abandoned, which is a continuation of application No. PCT/SE00/00822, filed on Apr. 28, 2000, now abandoned.

(60) Provisional application No. 60/132,359, filed on May 4, 1999, provisional application No. 60/162,445, filed on Oct. 29, 1999.

(30) Foreign Application Priority Data

May 4, 1999 (EP) .................................... 99850074
May 6, 1999 (SE) ...................................... 9901687
Oct. 29, 1999 (EP) .................................... 99850160

(51) Int. Cl.
*C01B 33/113* (2006.01)
*C01B 33/14* (2006.01)
*C01B 33/146* (2006.01)
*D21H 17/68* (2006.01)
*D21H 21/10* (2006.01)
*C01B 33/143* (2006.01)
*C01B 33/141* (2006.01)
*B01F 3/12* (2006.01)
*D21H 17/37* (2006.01)
*D21H 17/45* (2006.01)
*D21H 17/29* (2006.01)

(52) U.S. Cl.
CPC .............. *C01B 33/146* (2013.01); *D21H 17/68* (2013.01); *D21H 21/10* (2013.01); *D21H 17/375* (2013.01); *C01B 33/1435* (2013.01); *D21H 17/455* (2013.01); *D21H 17/29* (2013.01); *C01B 33/143* (2013.01); *C01B 33/141* (2013.01)
USPC ................ 516/81; 516/79; 423/335; 423/338

(58) Field of Classification Search
CPC C01B 33/146; C01B 33/141; C01B 33/1435; C01B 33/143; D21H 21/10; D21H 17/375; D21H 17/29; D21H 17/455
USPC .............. 516/80, 81, 82, 83, 84, 85; 423/338, 423/335
See application file for complete search history.

(56) References Cited

U.S. PATENT DOCUMENTS

| 2,577,485 | A | * | 12/1951 | Rule ................................ 516/81 |
| 2,630,410 | A | * | 3/1953 | Clapsadle et al. ............... 516/86 |
| 2,727,008 | A | * | 12/1955 | Iler ................................. 516/83 |
| 2,750,345 | A | * | 6/1956 | Alexander ....................... 516/83 |
| 2,892,797 | A | * | 6/1959 | Alexander et al. ............... 516/79 |
| 2,974,108 | A | * | 3/1961 | Alexander ....................... 516/79 |
| 3,083,167 | A | * | 3/1963 | Shannon ......................... 516/83 |
| 3,502,593 | A | * | 3/1970 | Mindick .......................... 516/83 |
| 3,533,816 | A | * | 10/1970 | Oken ............................. 106/600 |
| 3,560,400 | A | * | 2/1971 | Chilton ........................... 516/84 |
| 3,714,064 | A | * | 1/1973 | Vossos ............................ 516/81 |
| 3,857,925 | A | * | 12/1974 | Sirianni et al. ................. 423/339 |
| 3,922,393 | A | * | 11/1975 | Sears, Jr. ........................ 427/215 |
| 3,947,376 | A | * | 3/1976 | Albrecht ......................... 516/81 |
| 3,956,171 | A | * | 5/1976 | Moore et al. .................... 516/80 |
| 4,272,409 | A | * | 6/1981 | Bergna .............................. 502/8 |
| 4,285,919 | A | * | 8/1981 | Klotz et al. .................... 423/277 |

(Continued)

FOREIGN PATENT DOCUMENTS

| EP | 0 235 893 | * | 9/1987 |
| EP | 0 218 674 | * | 2/1989 |
| EP | 0 310 959 | * | 4/1989 |
| EP | 0 340 353 | * | 11/1989 |
| EP | 0 357 574 | * | 3/1990 |
| GB | 663013 | * | 12/1951 |
| WO | WO 91/07350 | * | 5/1991 |
| WO | WO 91/07351 | * | 5/1991 |
| WO | WO 93/01352 | * | 1/1993 |
| WO | WO 94/05595 | * | 4/1994 |

(Continued)

OTHER PUBLICATIONS

Sears, Jr., G. W., "Determination of Specific Surface Area of Colloidal Silica by Titration with Sodium Hydroxide," Analytical Chemistry, vol. 28, No. 12, pp. 1981-1983, (Dec. 1956).*

(Continued)

*Primary Examiner* — Daniel S Metzmaier
(74) *Attorney, Agent, or Firm* — Robert C. Morriss

(57) ABSTRACT

An aqueous sol containing silica-based particles which sol has a specific surface area of at least 115 $m^2/g$ aqueous sol and a pH of at least 10.5, and an S-value within the range of from 10 to 45% and/or contains silica-based particles having a specific surface area of at least 550 and less than about 1200 $m^2/g$ $SiO_2$, and wherein the sol is substantially free from aluminium.

17 Claims, No Drawings

(56) References Cited

U.S. PATENT DOCUMENTS

| | | | |
|---|---|---|---|
| 4,385,961 A * | 5/1983 | Svending et al. | 162/175 |
| 4,388,150 A * | 6/1983 | Sunden et al. | 162/175 |
| 4,554,211 A * | 11/1985 | Arika et al. | 428/402 |
| 4,750,974 A * | 6/1988 | Johnson | 162/164.1 |
| 4,753,710 A * | 6/1988 | Langley et al. | 162/164.3 |
| 4,798,653 A * | 1/1989 | Rushmere | 162/168.3 |
| 4,872,993 A * | 10/1989 | Harrison | 210/666 |
| 4,927,498 A * | 5/1990 | Rushmere | 162/168.3 |
| 4,954,220 A * | 9/1990 | Rushmere | 162/168.3 |
| 4,954,327 A * | 9/1990 | Blount | 423/338 |
| 4,961,825 A * | 10/1990 | Andersson et al. | 162/175 |
| 4,963,515 A * | 10/1990 | Helferich | 501/84 |
| 4,964,954 A * | 10/1990 | Johansson | 162/164.6 |
| 4,980,025 A * | 12/1990 | Andersson et al. | 162/168.3 |
| 5,030,286 A * | 7/1991 | Crawford et al. | 106/435 |
| 5,066,420 A * | 11/1991 | Chevallier | 516/82 |
| 5,071,512 A * | 12/1991 | Bixler et al. | 162/175 |
| 5,100,581 A * | 3/1992 | Watanabe et al. | 516/82 |
| 5,116,418 A * | 5/1992 | Kaliski | 106/419 |
| 5,127,994 A * | 7/1992 | Johansson | 162/168.3 |
| 5,160,455 A * | 11/1992 | Clark et al. | 516/112 |
| 5,176,891 A * | 1/1993 | Rushmere | 423/328.1 |
| 5,240,561 A * | 8/1993 | Kaliski | 162/138 |
| 5,277,764 A * | 1/1994 | Johansson et al. | 162/175 |
| 5,279,663 A * | 1/1994 | Kaliski | 106/486 |
| 5,279,807 A * | 1/1994 | Moffett et al. | 423/338 |
| 5,312,595 A * | 5/1994 | Moffett et al. | 422/129 |
| 5,368,833 A * | 11/1994 | Johansson et al. | 423/338 |
| 5,378,399 A * | 1/1995 | Kaliski | 516/98 |
| 5,447,604 A * | 9/1995 | Johansson et al. | 162/181.6 |
| 5,458,812 A * | 10/1995 | Brekau et al. | 516/83 |
| 5,470,435 A * | 11/1995 | Rushmere et al. | 162/181.6 |
| 5,482,693 A * | 1/1996 | Rushmere et al. | 423/328.1 |
| 5,503,820 A * | 4/1996 | Moffett et al. | 423/333 |
| 5,543,014 A * | 8/1996 | Rushmere et al. | 162/181.6 |
| 5,571,494 A * | 11/1996 | Saastamoinen | 516/82 |
| 5,603,805 A * | 2/1997 | Andersson et al. | 162/168.3 |
| 5,626,721 A * | 5/1997 | Rushmere et al. | 162/181.6 |
| 5,643,414 A * | 7/1997 | Johansson et al. | 162/164.6 |
| 5,846,384 A * | 12/1998 | Schold et al. | 162/175 |
| 5,858,174 A * | 1/1999 | Persson et al. | 162/164.1 |
| 6,372,089 B1 * | 4/2002 | Keiser et al. | 162/181.6 |
| 6,372,806 B1 * | 4/2002 | Keiser et al. | 516/82 |
| 7,169,261 B2 * | 1/2007 | Persson et al. | 162/181.6 |
| 7,732,495 B2 * | 6/2010 | Mankin et al. | 516/83 |
| 7,893,114 B2 * | 2/2011 | Mankin et al. | 516/83 |
| 7,919,535 B2 * | 4/2011 | Persson et al. | 516/79 |
| 8,148,434 B2 * | 4/2012 | Nyander et al. | 516/79 |
| 2003/0024671 A1 * | 2/2003 | Persson et al. | 162/181.6 |

FOREIGN PATENT DOCUMENTS

| | | | |
|---|---|---|---|
| WO | WO 94/05596 | * | 4/1994 |
| WO | WO 95/23021 | * | 8/1995 |
| WO | WO 97/18351 | * | 5/1997 |
| WO | WO 98/56715 | * | 12/1998 |
| WO | WO 98/56716 | * | 12/1998 |

OTHER PUBLICATIONS

Iler et al., "Degree of Hydration of Particles of Colloidal Silica in Aqueous Solution," Journal Phys. Chem., vol. 60; pp. 955-957. (Jul. 1956).*

Moffett, Robert H., "On-site production of a silica-based microparticulate retention and drainage aid," Tappi Journal, vol. 77, No. 12, pp. 133-138 (1994).*

English Language translation of Japanese Laid-Open No. 1987-83311; laid-open date Apr. 16, 1987.*

Derwent Abstract 107:25574, abstracting JP 62083311, (week 198721).*

Patent Abstracts of Japan abstracting JP 60 251119 (Dec. 1985).*

International Preliminary Examination Report No. PCT/SE00/00822 dated Aug. 1, 2001.*

International Search Report No. PCT/SE00/00822 dated Aug. 31, 2000.*

* cited by examiner

SILICA-BASED SOLS

This application is a continuation of U.S. application Ser. No. 10/999,867, filed Jan. 8, 2005, now U.S. Pat. No. 7,919,535, which is a division of U.S. application Ser. No. 10/007,861, filed Nov. 5, 2001, now abandoned, which is a continuation of PCT/SE00/00822, filed Apr. 28, 2000, now abandoned, which claims priority of European Patent Application No. 99850074.8, filed May. 4, 1999, U.S. Provisional Patent Application No. 60/132,359, filed May 4, 1999, Swedish Patent Application No. 9901687-5, filed May 6, 1999, European Patent Application No. 99850160.5, filed Oct. 29, 1999 and U.S Provisional Patent Application No. 60/162,445, filed Oct. 29,1999.

The present invention generally relates to silica-based sols suitable for use in papermaking. More particularly, the invention relates to silica-based sols and silica-based particles, their production and their use in the production of paper. The process of this invention provides silica-based particles and sols containing silica-based particles with high drainage and retention performance, high stability and high solids contents.

BACKGROUND

In the papermaking art, an aqueous suspension containing cellulosic fibres, and optional fillers and additives, referred to as stock, is fed into a headbox which ejects the stock onto a forming wire. Water is drained from the stock through the forming wire so that a wet web of paper is formed on the wire, and the paper web is further dewatered and dried in the drying section of the paper machine. Drainage and retention aids are conventionally introduced into the stock in order to facilitate drainage and to increase adsorption of fine particles onto the cellulosic fibres so that they are retained with the fibres on the wire.

Silica-based particles are widely used as drainage and retention aids in combination with charged organic polymers like anionic and cationic acrylamide-based polymers and cationic and amphoteric starches. Such additive systems are disclosed in U.S. Pat. Nos. 4,388,150; 4,961,825; 4,980,025; 5,368,833; 5,603,805; 5,607,552; and 5,858,174; and International Patent Application WO 97/18351. These systems are among the most efficient drainage and retention aids now in use.

Silica-based particles suitable for use as drainage and retention aids are normally supplied in the form of aqueous colloidal dispersions, so-called sols. Commercially used silica-based sols usually have a silica content of about 7 to 15% by weight and contain particles with a specific surface area of at least 300 m$^2$/g. Sols of silica-based particles with higher specific surface areas are usually more dilute to improve storage stability and avoid gel formation.

It would be advantageous to be able to provide silica-based sols and particles with further improved drainage and retention performance and even better stability. It would also be advantageous to be able to provide a process for preparing silica-based sols and particles with improved drainage, retention and stability properties. It would also be advantageous to be able to provide a papermaking process with improved drainage and/or retention.

THE INVENTION

In accordance with the present invention there are provided silica-based sols and particles which are suitable for use as flocculating agents in water purification and as drainage and retention aids in papermaking. The silica-based sols and particles according to the invention exhibit good stability over extended periods of time, notably high surface area stability and high stability towards gelation, and hence they can be prepared and shipped at high specific surface areas and high silica concentrations. The silica-based sols and particles have improved capability to maintain the high specific surface area on storage at high silica concentrations. The silica-based sols and particles according to the invention further result in very good or improved drainage and retention when used in conjunction with anionic, cationic and/or amphoteric organic polymers. Hereby the silica-based sols and particles according to the invention makes it possible to increase the speed of the paper machine and to use a lower dosage of additives to give a corresponding drainage and/or retention effect, thereby leading to an improved paper-making process and economic benefits. The invention thus relates to silica-based particles and an aqueous sol containing silica-based particles, herein also referred to as silica-based sol, and their production, as further defined in the appended claims.

The present invention also relates to the use of the silica-based sols and particles as drainage and retention aids in papermaking, preferably in combination with organic polymers as described herein, as further defined in the appended claims. The term "drainage and retention aid", as used herein, refers to one or more components (aids, agents or additives) which, when being added to a papermaking stock, give better drainage and/or retention than is obtained when not adding the components. The present invention further relates to a process for the production of paper from an aqueous suspension containing cellulosic fibres, and optional fillers, which comprises adding to the suspension silica-based particles and at least one charged organic polymer, forming and draining the suspension on a wire. The invention thus relates to a process as further defined in the appended claims.

The silica-based sols according to the present invention are aqueous sols that contain anionic silica-based particles, i.e. particles based on silica ($SiO_2$) or silicic acid. The particles are preferably colloidal, i.e., in the colloidal range of particle size. The silica-based particles present in the sol suitably have an average particle size below about 10 nm and preferably in the range of from about 10 to about 2 nm. As conventional in the chemistry of colloidal particles based on silica, particle size refers to the average size of the primary particles, which may be aggregated or non-aggregated.

The specific surface area of the silica-based sols is suitably at least 80 m$^2$/g aqueous sol, i.e., based on the weight of aqueous sol, preferably at least 85 m$^2$/g aqueous sol, more preferably at least 90 m$^2$/g aqueous sol and most preferably at least 95 m$^2$/g aqueous sol. In a preferred embodiment of this invention, the specific surface area of the aqueous silica-based sols is suitably at least 115 m$^2$/g aqueous sol, preferably at least 120 m$^2$/g aqueous sol. Generally, the specific surface area of the aqueous sol can be up to about 200 m$^2$/g aqueous sol, suitably up to 150 m$^2$/g aqueous sol and preferably up to 130 m$^2$/g aqueous sol.

The specific surface area of the silica-based particles is suitably at least 300 m$^2$/g $SiO_2$, i.e. based on the weight of $SiO_2$, preferably at least 400 m$^2$/g $SiO_2$ and most preferably at least 550 m$^2$/g $SiO_2$. Generally, the specific surface area of the particles can be up to about 1200 m$^2$/g $SiO_2$, suitably less than 1000 m$^2$/g $SiO_2$ and preferably up to 950 m$^2$/g $SiO_2$. In a preferred embodiment of this invention, the specific surface area of the particles is within the range of from 550 to 725 m$^2$/g $SiO_2$, preferably from 575 to 700 m$^2$/g $SiO_2$. In another preferred embodiment of this invention, the specific surface area of the particles is within the range of from 775 to 1200 $m^2/g$ $SiO_2$, preferably from 800 to less than 1000 $m^2/g$ $SiO_2$.

The specific surface area can be measured by means of titration with NaOH in known manner, e.g. as described by Sears in Analytical Chemistry 28 (1956):12, 1981-1983 and in U.S. Pat. No. 5,176,891, after appropriate removal of or adjustment for any compounds present in the sample that may disturb the titration like aluminium and boron species. When expressed in square metres per gram of aqueous sol, the specific surface area represents the specific surface area that is available per gram of aqueous silica-based sol. When expressed in square metres per gram of silica, the specific surface area represents the average specific surface area of the silica-based particles present in the sol.

The silica-based sols usually have an S-value within the range of from 10 to 45%, suitably from 20 to 40% and preferably from 25 to 35%. The S-value can be measured and calculated as described by Iler & Dalton in J. Phys. Chem. 60 (1956), 955-957. The S-value indicates the degree of aggregate or microgel formation and a lower S-value is indicative of a higher degree of aggregation.

The silica-based sols usually have a molar ratio of $SiO_2$ to $M_2O$, where M is alkali metal ion (e.g. Li, Na, K) and/or ammonium, of at least 10:1, suitably at least 12:1 and preferably at least 15:1. The molar ratio of $SiO_2$ to $M_2O$ generally can be up to 100:1, suitably up to 40:1 and preferably up to 30:1. Preferred ranges are thus from 10:1 to 100:1 and notably from 15:1 to 30:1. The silica-based sols usually have a pH of at least 8.0, suitably at least 10.0, preferably at least 10.5, and more preferably at least 10.6. The pH can be up to about 11.5, suitably up to 11.0.

The silica-based sols should suitably have a silica content of at least 3% by weight but it is more suitable that the silica content is within the range of from 10 to 30% by weight and preferably from 12 to 25% by weight. In order to simplify shipping and reduce transportation costs, it is generally preferable to ship high concentration silica-based sols but it is of course possible and usually preferable to dilute and mix the silica-based sols and particles to substantially lower silica contents prior to use, for example to silica contents within the range of from 0.05 to 5% by weight, in order to improve mixing with the furnish components. The viscosity of the silica-based sols can vary depending on, for example, the silica content of the sol. Usually, the viscosity is at least 5 cP, normally within the range of from 5 to 40 cP, suitably from 6 to 30 cP and preferably from 7 to 25 cP. The viscosity, which is suitably measured on sols having a silica content of at least 10% by weight, can be measured by means of known technique, for example using a Brookfield LVDV II+ viscosimeter.

The silica-based sols of this invention are preferably stable. The term "stable silica-based sol", as used herein, refers to silica-based sols which when subjected to storage or ageing for one month at 20° C. in dark and non-agitated conditions exhibit an increase in viscosity of less than 100 cP. Suitably the viscosity increase, if any, is less than 50 cP and preferably less than 30 cP when the sols are subjected to the above conditions.

In a preferred embodiment of this invention, the silica-based sol is substantially free from aluminium, i.e. free from added modifiers containing aluminium. In another preferred embodiment of this invention, the silica-based sol is substantially free from boron, i.e. free from added modifiers containing boron. Minor amounts of such elements can however be present in the starting materials used to prepare the silica-based sols and particles. In yet another preferred embodiment of this invention, the silica-based sols are modified using various elements, e.g. aluminium and/or boron, which can be present in the aqueous phase and/or in the silica-based particles. If aluminium is used, the sols can have a molar ratio of $Al_2O_3$ to $SiO_2$ within the range of from 1:4 to 1:1500, suitably from 1:8 to 1:1000 and preferably from 1:15 to 1:500. If boron is used, the sols can have a molar ratio of B to $SiO_2$ within the range of from 1:4 to 1:1500, suitably from 1:8 to 1:1000 and preferably from 1:15 to 1:500. If both aluminium and boron are used, the molar ratio of Al to B can be within the range of from 100:1 to 1:100, suitably from 50:1 to 1:50.

Silica-based sols and particles according to the invention can be produced starting from a conventional aqueous silicate solution like alkali water glass, e.g. potassium or sodium water glass, preferably sodium water glass. The molar ratio of $SiO_2$ to $M_2O$, where M is alkali metal, e.g. sodium, potassium, ammonium, or a mixture thereof, in the silicate solution or water glass is suitably within the range of from 1.5:1 to 4.5:1, preferably from 2.5:1 to 3.9:1. Suitably a dilute silicate solution or water glass is used which can have an $SiO_2$ content of from about 3 to about 12% by weight, preferably from about 5 to about 10% by weight. The silicate solution or water glass, which usually has a pH around 13 or above 13, is acidified to a pH of from about 1 to about 4. The acidification can be carried out in known manner by addition of mineral acids, e.g. sulphuric acid, hydrochloric acid and phosphoric acid, or optionally with other chemicals known as suitable for acidification of water glass, e.g. ammonium sulphate and carbon dioxide. When adding a mineral acid, the acidification is suitably carried out in two steps, a first step to a pH of about 8 to 9, whereupon a certain ripening, i.e., a particle growth, is allowed to occur before further acidification to a pH of from about 1 to about 4. However, it is preferred that the acidification is carried out by means of an acid cation exchanger which, among other things, lead to more stable products. The acidification is preferably carried out by means of a strongly acid cation exchange resin, for example of sulfonic acid type. It is preferred that the acidification is carried out to a pH of from about 2 to 4, most preferably from about 2.2 to 3.0. The product obtained, an acid sol or polysilicic acid, contains silica-based particles with a high specific surface area, normally above 1000 $m^2/g$ $SiO_2$ and usually around about 1300 to 1500 $m^2/g$ $SiO_2$.

The acid sol is then subjected to alkalisation, herein referred to as a first alkalisation step. The first alkalisation can be carried out by addition of conventional alkali, e.g. lithium hydroxide, sodium hydroxide, potassium hydroxide, ammonium hydroxide and mixtures thereof, and/or an aqueous silicate solution as defined above. Potassium and sodium water glass, particularly sodium water glass, with a molar ratio of $SiO_2$ to $M_2O$ as defined above, is suitably used in the alkalisation step. The $SiO_2$ content of the water glass solutions used for the first alkalisation is suitably within the range of from about 3 to about 35% by weight and preferably within the range of from 5 to 30% by weight. The first alkalisation is usually carried out to a pH of at least 6, suitably at least 7 and preferably at least 7.5, and the pH is usually up to 10.5, suitably up to 10.0. The first alkalisation is further suitably carried out to a final molar ratio of $SiO_2$ to $M_2O$, M being as defined above, of less than 100:1, suitably within the range of from about 20:1 to about 80:1, preferably from 30:1 to 70:1. In the preparation of a sol having a low S-value as defined above the degree of microgel can be influenced in several ways and be controlled to a desired value. The degree of microgel can be influenced by salt content, by adjustment of the concentration in the preparation of the acid sot and in the first alkalisation step since in this step the degree of microgel is influenced when the stability minimum for the sol is passed, at a pH of about 5. By prolonged times at this passage the degree of microgel can be directed to the desired value. It is particularly suitable to control the degree of microgel by adjustment of the dry content, the $SiO_2$ content, in the first alkalisation step whereby a higher dry content gives a lower S-value. By keeping the $SiO_2$ content in the first alkalisation step within the range of from 4.5 to 8% by weight the S-value can be controlled to the desired values of, for example, from 10 to 45%. To obtain sols with S-values within the range of from 20 to 40% the $SiO_2$ content in the first alkalisation step is suitably kept within the range of from 5.0 to 7.5% by weight.

The silica-based particles present in the alkalised sol obtained in the first alkalisation step is then subjected to particle growth so that particles with a lower specific surface area and higher stability are obtained. The particle growth process should suitably be carried out to provide silica-based particles with a specific surface area of at least 300 $m^2/g$ $SiO_2$, preferably at least 400 $m^2/g$ $SiO_2$, and most preferably at least 550 $m^2/g$ $SiO_2$, and up to about 1200 $m^2/g$ $SiO_2$, suitably less than 1000 $m^2/g$ $SiO_2$, notably up to 950 $m^2/g$ $SiO_2$. In a preferred embodiment of this invention, the particle growth process is carried out to provide particles with a specific surface area within the range of from 550 to 725 $SiO_2$, preferably from 575 to 700 $m^2/g$ $SiO_2$. In another preferred embodiment of this invention, is carried out to provide particles with a specific surface area of within the range of from 775 to 1200 $m^2/g$ $SiO_2$, preferably from 800 to less than 1000 $m^2/g$ $SiO_2$. The decrease in surface area can be obtained by storage at room temperature during somewhat longer times, a day up to about two days and nights, or, preferably, by heat treatment. In the heat treatment, times and temperatures can be adjusted so that shorter times are used at higher temperatures. Even if it of course is possible to use fairly high temperatures during very short times it is, from a practical point of view, more suitable to use lower temperatures during somewhat longer times. In the heat treatment, the alkalised sol should suitably be heated at a temperature of at least 30° C., suitably from 35 to 95° C. and preferably from 40 to 80° C. The heat treatment should suitably be carried out for at least 10 minutes, suitably from 15 to 600 minutes and preferably from 20 to 240 minutes.

After the particle growth step, and optional cooling, the obtained silica-based sol is again subjected to alkalisation, herein referred to as a second alkalisation step, which further increases the pH. The second alkalisation can be carried out by addition of conventional alkali, e.g. lithium hydroxide, sodium hydroxide, potassium hydroxide, ammonium hydroxide and mixtures thereof, and/or an aqueous silicate solution as defined above. Potassium and sodium water glass, particularly sodium water glass, with a molar ratio of $SiO_2$ to $M_2O$ as defined above, is suitably used in the second alkalisation step. The $SiO_2$ content of the water glass solutions used for the second alkalisation is suitably within the range of from about 3 to about 35% by weight and preferably within the range of from 5 to 30% by weight. The second alkalisation is suitably carried out to a pH of at least 8.0, suitably at least 10.0, preferably at least 10.5 and most preferably at least 10.6. The pH can be up to about 11.5, suitably up to 11.0. The second alkalisation is further suitably carried out to a final molar ratio of $SiO_2$ to $M_2O$, M being as defined above, within the range of from about 10:1 to 100:1 and suitably from 12:1 to 40:1, preferably from 15:1 to 30:1.

In a preferred embodiment of the invention, the process also comprises concentration of the silica-based sol. Concentration can be carried out after the second alkalisation. Alternatively, or additionally, the alkalised sol obtained after the first alkalisation but before the particle growth or heat treatment step, or the sol obtained after the particle growth or heat treatment step but before the second alkalisation, can be subjected to concentration. Concentration can be carried out in known manner such as, for example, by osmotic methods, evaporation and ultrafiltration. The concentration is suitably carried out to produce silica contents of at least 10% by weight, preferably from 10 to 30% by weight, and more preferably from 12 to 25% by weight. The concentration is further suitably carried out so that the silica-based sol obtained in the process has a specific surface area of at least 80 $m^2/g$ aqueous sol, i.e., based on the weight of aqueous sol, preferably at least 85 $m^2/g$ aqueous sol, more preferably at least 90 $m^2/g$ aqueous sol and most preferably at least 95 $m^2/g$ aqueous sol. In a preferred embodiment of this invention, the specific surface area of the aqueous silica-based sols obtained is suitably at least 115 $m^2/g$ aqueous sol, preferably at least 120 $m^2/g$ aqueous sol. Generally, the specific surface area of the aqueous sol obtained can be up to about 200 $m^2/g$ aqueous sol, suitably up to 150 $m^2/g$ aqueous sol and preferably up to 130 $m^2/g$ aqueous sol.

If desired, the silica-based sols and particles can be modified by addition of compounds containing, for example, aluminium and/or boron. Suitable aluminium-containing compounds include aluminates like sodium aluminate and potassium aluminate, suitably sodium aluminate. The aluminium-containing compound is suitably used in the form of an aqueous solution. Suitable boron-containing compounds include boric acid, borates like sodium and potassium borate, suitably sodium borate, tetraborates like sodium and potassium tetraborate, suitably sodium tetraborate, and metaborates like sodium and potassium metaborate. The boron-containing compound is suitably used in the form of an aqueous solution.

When using an aluminium-containing compound in the process, it is suitable to add it to the sol subjected to particle growth or heat treatment, either before or after the second alkalisation step. Alternatively, or additionally, the aluminium-containing compound can be added to the silicate solution to be acidified, to the acid sol or to the alkalised sol obtained in the first alkalisation step before the particle growth or heat treatment step. The aluminium-containing compound can be added in admixture with acid in the acidification step and in admixture with alkali or silicate solution in any of the alkalisation steps. The aluminium-containing compound is suitably added in an amount such that the obtained sol has a molar ratio of $Al_2O_3$ to $SiO_2$ as defined above, When using a boron-containing compound in the process, it is suitable to add it to the sol subjected to particle growth or heat treatment, either before or after the second alkalisation step. Alternatively, or additionally, the boron-containing compound can be added to the silicate solution to be acidified, to the acid sol or to the alkalised sol obtained in the first alkalisation step before the particle growth or heat treatment step. The boron-containing compound can be added in admixture with acid in the acidification step and in admixture with alkali or silicate solution in any of the alkalisation steps. The boron-containing compound is suitably added in an amount such that the obtained sol has a molar ratio of B to $SiO_2$ as defined above. If both aluminium-containing and boron-containing compounds are used, they are suitably added in amounts such that the obtained sol has a molar ratio of Al to B as defined above.

If the sol, before any aluminium and/or boron modification, contains too high amounts of alkali metal ions or ammonium ions, it is preferable to remove at least part of these ions, for example by ion exchange, to provide silica-based sols with a final molar ratio of $SiO_2$ to $M_2O$ within the desired range as defined above.

According to the present process, silica-based sols and particles, notably stable silica-based sots and particles, having the above characteristics can be prepared and the produced sols exhibit good storage stability and can be stored for several months without any substantial decrease of the specific surface area and without gelation.

The silica-based sols and particles according to this invention are suitable for use as flocculating agents, for example in the production of pulp and paper, notably as drainage and retention aids, and within the field of water purification, both for purification of different kinds of waste water and for purification specifically of white water from the pulp and paper industry. The silica-based sols and particles can be used as flocculating agents, notably as drainage and retention aids, in combination with organic polymers which can be selected from anionic, amphoteric, non-ionic and cationic polymers and mixtures thereof, herein also referred to as "main polymer". The use of such polymers as flocculating agents and as drainage and retention aids is well known in the art. The polymers can be derived from natural or synthetic sources, and they can be linear, branched or cross-linked. Examples of generally suitable main polymers include anionic, amphoteric and cationic starches, anionic, amphoteric and cationic guar gums, and anionic, amphoteric and cationic acrylamide-based polymers, as well as cationic poly(diallyldimethyl ammonium chloride), cationic polyethylene imines, cationic polyamines, polyamidoamines and vinylamide-based polymers, melamine-formaldehyde and urea-formaldehyde resins. Suitably the Silica-based sols are used in combination with at least one cationic or amphoteric polymer, preferably cationic polymer. Cationic starch and cationic polyacrylamide are particularly preferred polymers and they can be used singly, together with each other or together with other polymers, e.g. other cationic polymers or anionic polyacrylamide. The molecular weight of the main polymer is suitably above 1,000,000 and preferably above 2,000,000. The upper limit is not critical; it can be about 50,000,000, usually 30,000,000 and suitably about 25,000,000. However, the molecular weight of polymers derived from natural sources may be higher.

When using the present silica-based sols and particles in combination with main polymer(s) as mentioned above, it is further preferred to use at least one low molecular weight (hereinafter LMW) cationic organic polymer, commonly referred to and used as anionic trash catchers (ATC). ATC's are known in the art as neutralizing and/or fixing agents for detrimental anionic substances present in the stock and the use thereof in combination with drainage and retention aids often provide further improvements in drainage and/or retention. The LMW cationic organic polymer can be derived from natural or synthetic sources, and preferably it is an LMW synthetic polymer. Suitable organic polymers of this type include LMW highly charged cationic organic polymers such as poly-amines, polyamidoamines, polyethyleneimines, homo- and copolymers based on diallyl-dimethyl ammonium chloride, (meth)acrylamides and (meth)acrylates. In relation to the molecular weight of the main polymer, the molecular weight of the LMW cationic organic polymer is preferably lower, it is suitably at least 1,000 and preferably at least 10,000. The upper limit of the molecular weight is usually about 700,000, suitably about 500,000 and usually about 200,000. Preferred combinations of polymers that can be co-used with the silica-based sols of this invention include LMW cationic organic polymer in combination with main polymer(s), such as, for example, cationic starch and/or cationic polyacrylamide, anionic polyacrylamide as well as cationic starch and/or cationic polyacrylamide in combination with anionic polyacrylamide.

The components of the drainage and retention aids according to the invention can be added to the stock in conventional manner and in any order. When using drainage and retention aids comprising silica-based particles and an organic polymer, e.g. a main polymer, it is preferred to add the polymer to the stock before adding the silica-based particles, even if the opposite order of addition may be used. It is further preferred to add the main polymer before a shear stage, which can be selected from pumping, mixing, cleaning, etc., and to add the silica-based particles after that shear stage. LMW cationic organic polymers, when used, are preferably introduced into the stock prior to introducing the main polymer. Alternatively, the LMW cationic organic polymer and the main polymer can be introduced into stock essentially simultaneously, either separately or in admixture, for example as disclosed in U.S. Pat. No. 5,858,174, which is hereby incorporated herein by reference. The LMW cationic organic polymer and the main polymer are preferably introduced into the stock prior to introducing the silica-based particles.

In a preferred embodiment of this invention, the silica-based sols and particles are used as drainage and retention aids in combination with at least one organic polymer, as described above, and at least one aluminium compound. Aluminium compounds can be used to further improve the drainage and/or retention performance of stock additives comprising silica-based particles. Suitable aluminium salts include alum, aluminates, aluminium chloride, aluminium nitrate and polyaluminum compounds, such as polyaluminum chlorides, polyaluminum sulphates, polyaluminum compounds containing both chloride and sulphate ions, polyaluminum silicate-sulphates, and mixtures thereof. The polyaluminum compounds may also contain other anions, for example anions from phosphoric acid, organic acids such as citric acid and oxalic acid. Preferred aluminium salts include sodium aluminate, alum and polyaluminum compounds. The aluminium compound can be added before or after the addition of the silica-based particles. Alternatively, or additionally, the aluminium compound can be added simultaneously with the silica-based sot at essentially the same point, either separately or in admixture with it, for example as disclosed by U.S. Pat. No. 5,846,384 which is hereby incorporated herein by reference. In many cases, it is often suitable to add an aluminium compound to the stock early in the process, for example prior to the other additives.

The components of the drainage and retention aids according to the invention are added to the stock to be dewatered in amounts which can vary within wide limits depending on, inter alia, type and number of components, type of furnish, filler content, type of filler, point of addition, etc. Generally the components are added in an amount that give better drainage and/or retention than is obtained when not adding the components. The silica-based sols and particles are usually added in an amount of at least 0.001% by weight, often at least 0.005% by weight, calculated as $SiO_2$ and based on dry stock substance, i.e. cellulosic fibres and optional fillers, and the upper limit is usually 1.0% and suitably 0.5% by weight. The main polymer is usually added in an amount of at least 0.001%, often at least 0.005% by weight, based on dry stock substance, and the upper limit is usually 3% and suitably 1.5% by weight. When using an LMW cationic organic polymer in the process, it can be added in an amount of at least 0.05%, based on dry substance of the stock to be dewatered. Suitably, the amount is in the range of from 0.07 to 0.5%, preferably in the range from 0.1 to 0.35%. When using an aluminium compound in the process, the total amount introduced into the stock to be dewatered depends on the type of aluminium compound used and on other effects desired from it. It is for instance well known in the art to utilise aluminium compounds as precipitants for rosin-based sizing agents. The total amount added is usually at least 0.05%, calculated as $Al_2O_3$ and based on dry stock substance. Suitably the amount is in the range of from 0.1 to 3.0%, preferably in the range from 0.5 to 2.0%.

Further additives which are conventional in papermaking can of course be used in combination with the additives according to the invention, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other cellulosic fibre-containing sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof. The pH of the suspension, the stock, can be within the range of from about 3 to about 10. The pH is suitably above 3.5 and preferably within the range of from 4 to 9.

The invention is further illustrated in the following Examples which, however, are not intended to limit the same. Parts and % relate to parts by weight and % by weight, respectively, unless otherwise stated.

EXAMPLE 1

A standard silica sol was prepared as follows:

762.7 g sodium water glass with a molar ratio of $SiO_2$ to $Na_2O$ of 3.3 and $SiO_2$ content of 27.1% was diluted with water to 3000 g yielding a silicate solution (I) with a $SiO_2$ content of 6.9% by weight. 2800 g of this silicate or water glass solution was passed through a column filled with a strong cation exchange resin saturated with hydrogen ions. 2450 g of ion-exchanged water glass or polysilicic acid (II) with an $SiO_2$ content of 6.5% by weight and a pH of 2.4 was collected from the ion exchanger. 1988 g of the polysilicic acid (II) was fed into a reactor and diluted with 12.3 g water. 173.9 g of the 6.9% silicate solution (I) was then added under vigorous agitation. The resulting solution was then heated at 85° C. for 60 minutes and then cooled to 20° C. The obtained silica sol (1a) had the following characteristics:

Sol 1a (ref.): $SiO_2$ content=7.3% by weight, molar ratio $SiO_2$/$Na_2O$=40, pH=10.2, S-value=29%, viscosity=2.2 cP, specific surface areas=530 $m^2$/g $SiO_2$ and 39 $m^2$/g aqueous sol.

Two further silica sols, Sol 1b and Sol 1c, were produced which had the following characteristics:

Sol 1b (ref.): $SiO_2$ content=7.3% by weight, molar ratio $SiO_2$/$Na_2O$=63, pH=10.0, S-value=26%, viscosity=2.7 cP, specific surface areas=500 $m^2$/g $SiO_2$ and 36.5 $m^2$/g aqueous sol Sol 1c (ref.): $SiO_2$ content=5.4% by weight, molar ratio $SiO_2$/$Na_2O$=35, pH=9.8, S-value=32%, viscosity=1.6 cP, specific surface areas=690 $m^2$/g $SiO_2$ and 37 $m^2$/g aqueous sol.

EXAMPLE 2

Six sols of silica-based particles according to the invention were prepared from a polysilicic acid similar to the polysilicic acid (II) produced with the same ion exchange process and with an $SiO_2$ content of 5.46% by weight. To 102.0 kg of the polysilicic acid was added 1.46 kg of sodium water glass with a ratio $SiO_2$/$Na_2O$ of 3.3 under vigorous agitation resulting in a solution with a molar ratio $SiO_2$/$Na_2O$ of 54.0. This solution was heat treated at 60° C. for 2 h 20 min and cooled to 20° C. whereupon the product was concentrated to a $SiO_2$ content of 15.6% by weight. This intermediate sol product was now divided into six separate samples, a to f. Samples a to c were further alkalised with NaOH, samples d to f with water glass, to achieve sols with a molar ratio $SiO_2$/$Na_2O$ between 21.5 and 34.0 and a silica content of about 15.0% by weight. The obtained sols of silica-based particles had the characteristics set forth in Table 1:

TABLE 1

| Sol | Molar ratio [$SiO_2$/$Na_2O$] | pH | S-value [%] | Viscosity [cp] | Specific Surface Areas [$m^2$/g $SiO_2$] | [$m^2$/g aq. sol] |
|---|---|---|---|---|---|---|
| Sol 2a | 21.5 | 10.7 | 31 | 17 | 720 | 108.0 |
| Sol 2b | 28.0 | 10.3 | 30 | 29 | 710 | 106.5 |
| Sol 2c | 34.0 | 10.0 | 29 | 40 | 690 | 103.5 |
| Sol 2d | 21.5 | 10.7 | 31 | 20 | 680 | 102.0 |
| Sol 2e | 28.0 | 10.3 | 29 | 34 | 670 | 100.5 |
| Sol 2f | 33.0 | 10.0 | 29 | 38 | 680 | 102.0 |

EXAMPLE 3

A polysilicic acid (II) produced with the above ion exchange process and alkalised with water glass to a molar ratio $SiO_2$/$Na_2O$ of 54.0 as in Example 2 was heat treated at 60° C. for 1 h. To 58 kg of this product was added 7.25 kg of diluted water glass with a molar ratio $SiO_2$/$Na_2O$ of 3.3 and silica content 5.5% by weight. The resulting sol of silica-based particles, Sol 3, was concentrated to a silica content of 15.2% by weight and had a molar ratio $SiO_2$/$Na_2O$=24, pH=10.7, S-value=34, viscosity=9.0 cp and specific surface areas=760 $m^2$/g $SiO_2$ and 115.5 $m^2$/g aqueous sol.

EXAMPLE 4

1000 g polysilicic acid (II) with an $SiO_2$ content of 5.5% by weight was mixed with 14.5 g water glass solution with an $SiO_2$ content of 27.1% by weight and a molar ratio $SiO_2$/$Na_2O$=3.3 under vigorous agitation resulting in a product with a molar ratio $SiO_2$/$Na_2O$ of 51 and a silica content of 5.8% by weight $SiO_2$, which was heat treated at 60° C. for 1.5 h and then concentrated to a silica content of 16.7% by weight $SiO_2$. 283 g of the product obtained was mixed with 33.0 g NaOH resulting in a sol of silica-based particles, Sol 4, with $SiO_2$ content=15.2% by weight, molar ratio $SiO_2$/$Na_2O$=21, pH=10.6, S-value=32%, viscosity=14.2 cP and specific surface areas=720 m²/g $SiO_2$ and 109.4 m²/g aqueous sol.

EXAMPLE 5

The general procedure according to Example 3 was followed except that the heat treatment was carried for 1.25 h and concentration was carried out to higher silica contents. Two sols of silica-based particles were prepared; Sol 5a and Sol 5b. Sol 5a had $SiO_2$ content=18% by weight, molar ratio $SiO_2/Na_2O$=18, pH=10.7, S-value=36%, viscosity=18 cP and specific surface areas=700 m²/g $SiO_2$ and 126 m²/g aqueous sol. Sol 5b had $SiO_2$ content=20% by weight, molar ratio $SiO_2/Na_2O$=18, pH=10.7, S-value=37%, viscosity=31 cP and specific surface areas=700 m²/g $SiO_2$ and 140 m²/g aqueous sol.

EXAMPLE 6

Drainage performance was evaluated by means of a Dynamic Drainage Analyser (DDA), available from Akribi, Sweden, which measures the time for draining a set volume of stock through a wire when removing a plug and applying vacuum to that side of the wire opposite to the side on which the stock is present.

The stock used was based on a blend of 60% bleached birch sulphate and 40% bleached pine sulphate to which was added 30% ground calcium carbonate as a filler. Stock volume was 800 ml, consistency 0.25% and pH about 8.0. Conductivity of the stock was adjusted to 0.47 mS/cm by addition of sodium sulphate.

In the tests, silica-based sols were used in conjunction with a cationic polymer, Raisamyl 142, which is a conventional medium-high cationised starch having a degree of substitution of 0.042, which was added to the stock in an amount of 12 kg/tonne, calculated as dry starch on dry stock system. Silica-based sols according to Examples 1 to 4 were tested in this Example. In addition, Sols 6a and 6b were also tested for comparison purposes. Sol 6a is a commercial silica sol with an S-value=45%, $SiO_2$ content=15.0% by weight, molar ratio $SiO_2/Na_2O$=40, viscosity=3.0 cP, specific surface areas=500 m²/g $SiO_2$ and 75 m²/g aqueous sol. Sol 6b is another commercial silica sol with an S-value=36%, $SiO_2$ content=10.0% by weight, molar ratio $SiO_2/Na_2O$=10, viscosity=2.5 cP, specific surface areas=880 m²/g $SiO_2$ and 88 m²/g aqueous sol. The silica-based sols were added in an amount of 0.5 kg/ton, calculated as $SiO_2$ and based on dry stock system.

The stock was stirred in a baffled jar at a speed of 1500 rpm throughout the test and chemical additions were conducted as follows: i) adding cationic starch to the stock following by stirring for 30 seconds, ii) adding silica-based sol to the stock followed by stirring for 15 seconds, iii) draining the stock while automatically recording the drainage time.

Drainage times for the different silica-based sols are shown in Table 2:

TABLE 2

| Silica-based sol | Dewatering time [sec] |
| --- | --- |
| Sol 1a (ref.) | 12.0 |
| Sol 1b (ref.) | 11.1 |
| Sol 1c (ref.) | 12.0 |
| Sol 2d | 9.7 |
| Sol 3 | 9.5 |
| Sol 4 | 9.4 |
| Sol 6a (ref.) | 12.0 |
| Sol 6b (ref.) | 9.8 |

EXAMPLE 7

Drainage performance was evaluated according to the general procedure of Example 6 except that the stock had a consistency of 0.3% and pH about 8.5. Retention performance was evaluated by means of a nephelometer by measuring the turbidity of the filtrate, the white water, obtained by draining the stock.

Silica-based sols according to Example 5 according to the invention were tested against Sol 6a used for comparison. Table 3 shows the drainage time obtained at various dosages (kg/ton) of silica-based particles, calculated as $SiO_2$ and based on dry stock system. The addition of only cationic starch (12 kg/tonne, calculated as dry starch on dry stock system) resulted in a drainage time of 15.8 sec.

TABLE 3

| Silica-based sol | Drainage time (sec)/Turbidity (NTU) at $SiO_2$ dosage of | | | | |
| --- | --- | --- | --- | --- | --- |
| | 0.5 kg/t | 1.0 kg/t | 1.5 kg/t | 2.0 kg/t | 3.0 kg/t |
| Sol 6a (ref.) | 11.1/— | 8.8/59 | 7.9/58 | 7.1/54 | 6.8/60 |
| Sol 5a | 9.0/— | 7.1/52 | 6.3/50 | 5.2/52 | 5.7/53 |
| Sol 5b | 8.9/— | 6.9/— | 6.3/— | 5.7/— | 6.0/— |

The invention claimed is:

1. An aqueous sol containing silica-based particles wherein the sol has a specific surface area of at least 115 m²/g aqueous sol, thereby representing the specific surface area that is available per gram of aqueous silica-based sol, said silica-based particles have a specific surface area within the range of from 550 m²/g $SiO_2$ and less than about 1200 m²/g $SiO_2$, thereby representing the average specific surface area of the silica-based particles present in the sol, wherein the specific surface area is determined by means of titration with NaOH after removal of or adjustment for any compounds present that may disturb the titration, wherein the sol has a pH of at least 10.5, and wherein the sol is substantially free from aluminium.

2. The aqueous sol according to claim 1 wherein the sol has a molar ratio of $SiO_2$ to $M_2O$, where M is alkali metal or ammonium, within the range of from 15:1 to 40:1.

3. The aqueous sol according to claim 1 wherein the sol has an S-value within the range of from 25 to 35%.

4. The aqueous sol according to claim 3 wherein the sol has a specific surface area of at least 120 m²/g aqueous sol.

5. The aqueous sol according to claim 1 wherein the sol has a specific surface area of at least 120 m²/g aqueous sol.

6. The aqueous sol according to claim 1 wherein the sol has a silica content within the range of from 10 to 30% by weight.

7. The aqueous sol according to claim 1 wherein the sol has a viscosity within the range of from 5 to 40 cP.

8. The aqueous sol according to claim 1 wherein the sol is a stable silica sol.

9. An aqueous sol containing silica-based particles wherein the sol has a specific surface area of at least 115 m²/g aqueous sol, thereby representing the specific surface area that is available per gram of aqueous silica-based sol, and an S-value within the range of from 10 to 45%, wherein the specific surface area is determined by means of titration with NaOH after removal of or adjustment for any compounds present that may disturb the titration, wherein the sol has a pH of at least 10.5, and wherein the sol is substantially free from aluminium.

10. The aqueous sol according to claim 9 wherein the sol has a molar ratio of $SiO_2$ to $M_2O$, where M is alkali metal or ammonium, within the range of from 15:1 to 40:1.

11. The aqueous sol according to claim 9 wherein the silica-based particles have a specific surface area of at least 550 $m^2/g$ $SiO_2$.

12. The aqueous sol according to claim 9 wherein the sol has a specific surface area of at least 120 $m^2/g$ aqueous sol.

13. The aqueous sol according to claim 9 wherein the silica- based particles have a specific surface area of at least 300 $m^2/g$ $SiO_2$ and less than 1200 $m^2/g$ $SiO_2$.

14. The aqueous sol according to claim 9 wherein the sol has a pH of at least 10.6.

15. The aqueous sol according to claim 9 wherein the sol is a stable silica-based sol.

16. An aqueous sol having
    (a) a specific surface area of at least 115 $m^2/g$ aqueous sol, thereby representing the specific surface area that is available per gram of aqueous silica-based sol;
    (b) an S-value within the range of from 10 to 45%;
    (c) a molar ratio of $SiO_2$ to $M_2O$, where M is alkali metal or ammonium, within the range of from 15:1 to 40:1; and
    (d) a pH of at least 10.5;
    and containing
    (e) silica-based particles which have a specific surface area of at least 550 $m^2/g$ $SiO_2$ and less than about 1200 $m^2/g$ $SiO_2$, thereby representing the average specific surface area of the silica-based particles present in the sol,
    wherein the specific surface area is determined by means of titration with NaOH after removal of or adjustment for any compounds present that may disturb the titration, and
    wherein the sol is substantially free from aluminium.

17. The aqueous sol according to claim 16 wherein the sol is a stable silica-based sol.

\* \* \* \* \*